United States Patent [19]

Gruenewald

[11] Patent Number: 4,816,075

[45] Date of Patent: Mar. 28, 1989

[54] APPARATUS FOR COMMINUTING PLANT MATERIAL FOR FURTHER TREATMENT

[75] Inventor: Werner Gruenewald, Wolfenbuettel, Fed. Rep. of Germany

[73] Assignee: Braunschweigische Maschinenbauanstalt AG, Braunschweig, Fed. Rep. of Germany

[21] Appl. No.: 183,291

[22] Filed: Apr. 11, 1988

Related U.S. Application Data

[63] Continuation of Ser. No. 915,637, Oct. 6, 1986, abandoned.

[30] Foreign Application Priority Data

Oct. 30, 1985 [DE] Fed. Rep. of Germany ....... 3538561

[51] Int. Cl.[4] ............................ B01J 3/00; C13C 1/04

[52] U.S. Cl. .................................. 127/2; 241/152 R; 241/155; 241/160; 241/162

[58] Field of Search ............... 127/2; 241/152 R, 155, 241/160, 162

[56] References Cited

U.S. PATENT DOCUMENTS

| | | | |
|---|---|---|---|
| 1,097,919 | 5/1914 | Edsall et al. | 244/160 |
| 3,225,803 | 12/1965 | Hayot | 241/200 |
| 4,572,741 | 2/1986 | Mason | 127/2 |

FOREIGN PATENT DOCUMENTS

| | | |
|---|---|---|
| 1218970 | 6/1966 | Fed. Rep. of Germany . |
| 2353989 | 5/1974 | Fed. Rep. of Germany . |
| 1192084 | 5/1970 | United Kingdom . |

*Primary Examiner*—Curtis R. Davis
*Assistant Examiner*—Chung K. Pak
*Attorney, Agent, or Firm*—W. G. Fasse; D. H. Kane, Jr.

[57] ABSTRACT

An apparatus for preparing plant material, such as sugar cane, comminutes the material for further processing, for example, by cane mills or a diffuser. An upfront cutter (2) and a shredder (8) are immediately adjoining each other at the end of an adjustable speed conveyor (1). A material guide housing forms with its guide channel sections an inverted V-shape. One guide channel section reaches upwardly and extends over the discharge gap (6*a*) of the upfront cutter. Another guide channel section reaches downwardly to the shredder. An intermediate guide channel section interconnects the upwardly and downwardly reaching sections to form a closed guide channel construction. An upper channel wall portion remote from the upfront cutter and from the shredder forms an impact and deflection baffle (11*c*) for the precomminuted material ejected by the upfront cutter for feeding the material to the shredder. The apparatus is compact and assures a uniform material feed to the shredder.

6 Claims, 3 Drawing Sheets

APPARATUS FOR COMMINUTING PLANT MATERIAL FOR FURTHER TREATMENT

This application is a continuation of application Ser. No. 915,637, filed Oct. 6, 1986, now abandoned.

FIELD OF THE INVENTION

The invention relates to an apparatus for comminuting plant material, for example sugar cane or similar material, e.g. millet, for further treatment in cane mills or in a diffuser. Such an apparatus includes an adjustable speed conveyor for conveying the non-comminuted cane to an upfront cutter cooperating with a washboard, followed by a shredder.

DESCRIPTION OF THE PRIOR ART

Such devices are known in the art. In one type an upfront cutter is arranged at the end of a conveyor for the not yet comminuted sugar cane. The cutter extends above a conveyor for the sugar cane emerging from the processing gap of the upfront cutter. The conveyor terminates above a feed chute for the shredder. The comminuted material emerging from the shredder is then conveyed by a further conveyor to a sugar cane mill or a mill train or the like.

In another type of construction a cane knife is provided above the conveyor for feeding the non-comminuted cane. The knife initially cuts the sugar cane maintained on the conveyor relatively coarsely prior to passing the coarsely comminuted sugar cane on to the upfront cutter provided at the end of the conveyor. The upfront cutter in this second type is positioned above the feeding chute of a shredder provided immediately below the cutter. The comminuted sugar cane emerging from the shredder is passed onto a conveyor for feeding to a cane mill or a mill train, or a diffuser.

Both known types have considerable drawbacks, which more particularly reside in their inability to attain a uniform and constant feed of comminuted material to the shredder. On the other hand, the degree of cell disruption of the sugar cane depends on the fact that the precomminuted sugar cane is treated uniformly in the shredder. However, such uniform treatment is only attainable if the comminuted sugar cane is passed to the shredder over its entire operating width in the form of a bed of material which is uniform in space and time. In other words, the shredder must be able to withdraw the material from the feed chute in the described manner as a continuous uniform bed of material for assuring a uniform throughput.

It is virtually impossible to attain such mode of operation with the known devices.

However, the first type makes it possible to render the feed of the non-comminuted cane to the upfront cutter more uniformly by virtue of the adjustable drive of the conveyor. Yet, local accumulations of the precomminuted sugar cane on the intermediate conveyor and an irregular feed of the precomminuted sugar cane to the shredder, cannot be avoided. If the intermediate conveyor takes the form of a scraper flight conveyor, the precomminuted sugar cane accumulates ahead of each of the flights in the direction of conveyance, whereas in the opposite direction behind the flights minor amounts, at best, of the comminuted sugar cane accumulate. In the case of rubber belt conveyors, the formation of a trough by the rubber belt will cause an accumulation of the material longitudinally in the central region of the conveyor belt. As a result, the shredder is fed with the precomminuted sugar cane either in the form of heaps or batches or the material is supplied non-uniformly along the length of the shredder. Besides, the first type of known construction needs three conveyors for its operation.

In the second type of construction the material which has been precomminuted by means of the upfront cutter, is flung with considerable momentum into the feed chute or onto the rotor of the shredder, such that in this case as well any lack of uniformity in the feed of the non-comminuted cane to the upfront cutter also affects the feed of the precomminuted material to the shredder.

Moreover, the known two types require quite considerable construction costs, particularly for the supporting structure and the drive means required for the upfront cutter and the shredder. These known types also have quite considerable space requirements so that correspondingly large buildings are required for accommodating these known devices.

OBJECTS OF THE INVENTION

In view of the foregoing it is the aim of the invention to achieve the following objects singly or in combination:

to avoid the disadvantages of the above described constructions, more specifically, to provide an apparatus of the type defined above which assures a uniform and continuous flow of material to the shredder in combination with a reduction of the structural efforts and expenses;

to supply the material comminuted by the upfront cutter, in a uniform distribution over the entire width of the shredder, even if material is supplied to the cutter in a non-uniform manner; and to make the cutter shredder combination as compact as possible.

SUMMARY OF THE INVENTION

The apparatus of the invention is characterized in that the upfront cutter and the shredder are arranged immediately adjoining each other so that their respective axes of rotation are arranged in a plane which is horizontal or inclined to the horizontal. The shredder and the upfront cutter are covered by a material guide housing or casing having several sections extending approximately vertically from the plane defined by the rotational axes of the cutter and shredder. One material guide or casing section cooperates with the cutter and has an open cross-section located to receive approximately upwardly directed cut material from the upfront cutter. This one guide housing section extends over and beyond the discharge gap of the upfront cutter. Another guide housing or casing section constitutes the feed chute for the shredder. Both casing or housing sections are interconnected, preferably integrally, by a further guide casing section or guide housing section which is a closed unit. The housing has a wall portion remote from the upfront cutter and from the shredder which forms an impact and deflection baffle for the comminuted material ejected by the upfront cutter for feeding this material to the shredder.

BRIEF DESCRIPTION OF THE DRAWINGS

In order that the invention may be clearly understood, it will now be described, by way of example, with reference to the accompanying drawings, wherein.

Figure 1:
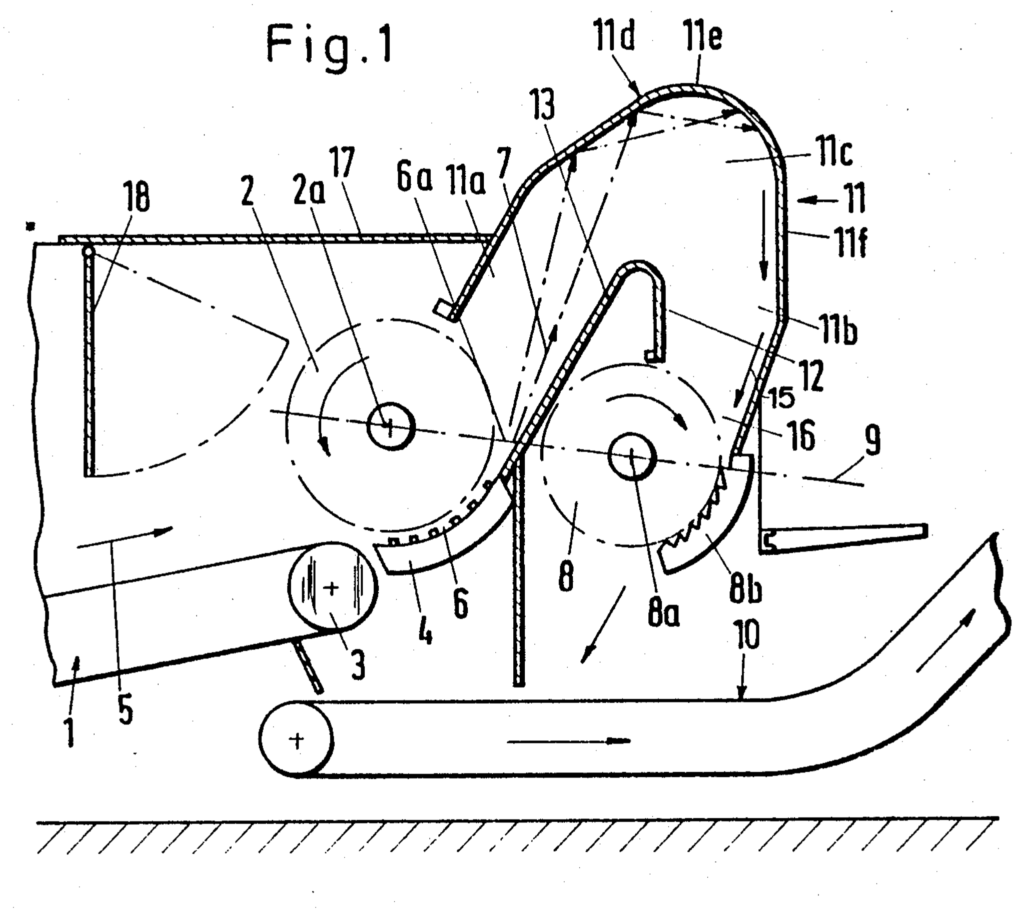
FIG. 1 is a schematic, longitudinal section through the apparatus but without the associated supporting structure.

DETAILED DESCRIPTION OF PREFERRED EXAMPLE EMBODIMENTS AND OF THE BEST MODE OF THE INVENTION

A speed adjustable supply conveyor 1 for feeding material such as non-comminuted sugar cane to an upfront cutter 2 passes over a return roller 3 in the immediate vicinity of the upfront cutter 2. The upfront cutter 2 cooperates with a washboard 4 which extends close to the return roller 3 of the conveyor 1 such that the non-comminuted sugar cane conveyed on the conveyor 1 in the direction of the arrow 5 is drawn into the processing gap 6 between the upfront cutter 2 and the washboard 4. The cut or precomminuted material is ejected upwardly from this gap in the direction of the arrow 7.

A shredder 8 is provided at an incline below and immediately adjoining the upfront cutter 2. The axes of rotation 2*a* of the upfront cutter and 8*a* of the shredder are positioned in a plane 9 extending horizontally or slightly inclined to the horizontal as shown in FIG. 1 by dash-dotted lines. The angle between the plane 9 and the horizontal may be of the order of between 0° and 45°.

The shredder 8 also cooperates with a washboard 8*b* which is coacting with the beater tools of the shredder 8 for further comminuting the precomminuted sugar cane to such an extent that it can subsequently be passed to sugar cane mills or to a diffuser not shown.

Below the shredder 8 a feed-out conveyor 10 passes the material emerging from the shredder 8 to further processing.

According to the invention, a material guide housing 11 extends upwardly approximately normal to the plane 9 defined by the axes 2*a* and 8*a* of rotation of the upfront cutter 2 and of the shredder 8. The housing 11 has a first material guide section 11*a* leading upwardly above and partially over the discharge gap 6*a* of the upfront cutter 2. The housing 11 further has a direction reversing section 11*c*, 11*d*, 11*e* and a third downwardly leading section 11*b* forming a duct for feeding cut material to the shredder 8.

The housing section 11*c* closes the two duct forming sections 11*a*, 11*b* in an upward direction and preferably joins the sections 11*a* and 11*b* in an integral manner. The upper limiting wall of the housing section 11*c* constitutes an impact and deflection baffle 11*d* which comprises a rounded section 11*e* merging into the side walls 11*f* of the housing section 11*c*.

The duct forming housing sections 11*a* and 11*b* are separated on their mutually facing sides by duct wall portions 12 and 13 enclosing an acute angle and joined by an upper curved wall portion. Preferably, the wall portion 11 extends tangentially relative to the discharge gap 6*a* of the upfront cutter 2 such that the material emerging from this discharge gap is conducted in the direction of the arrows shown in dash-dotted lines against the impact and deflecting baffle 11*d*, from there to bounce in the direction of the arrows illustrated in FIG. 1 onto the side wall 11*f* of the guide housing section 11*c* away from the upfront cutter 2 in order to proceed in the direction of the arrow 15 into the inlet gap 16 of the shredder 8. Due to the impact of the precomminuted material against the impact and deflecting baffle 11*d*, the velocity of this precomminuted material is greatly reduced and the material is so deflected that it passes in a sliding manner onto the entire side wall 11*f* of the casing 11*c* whereby a uniform, even bed or sheet of material is passed constantly in the direction toward the inlet gap 16 of the shredder 8.

Figure 2:
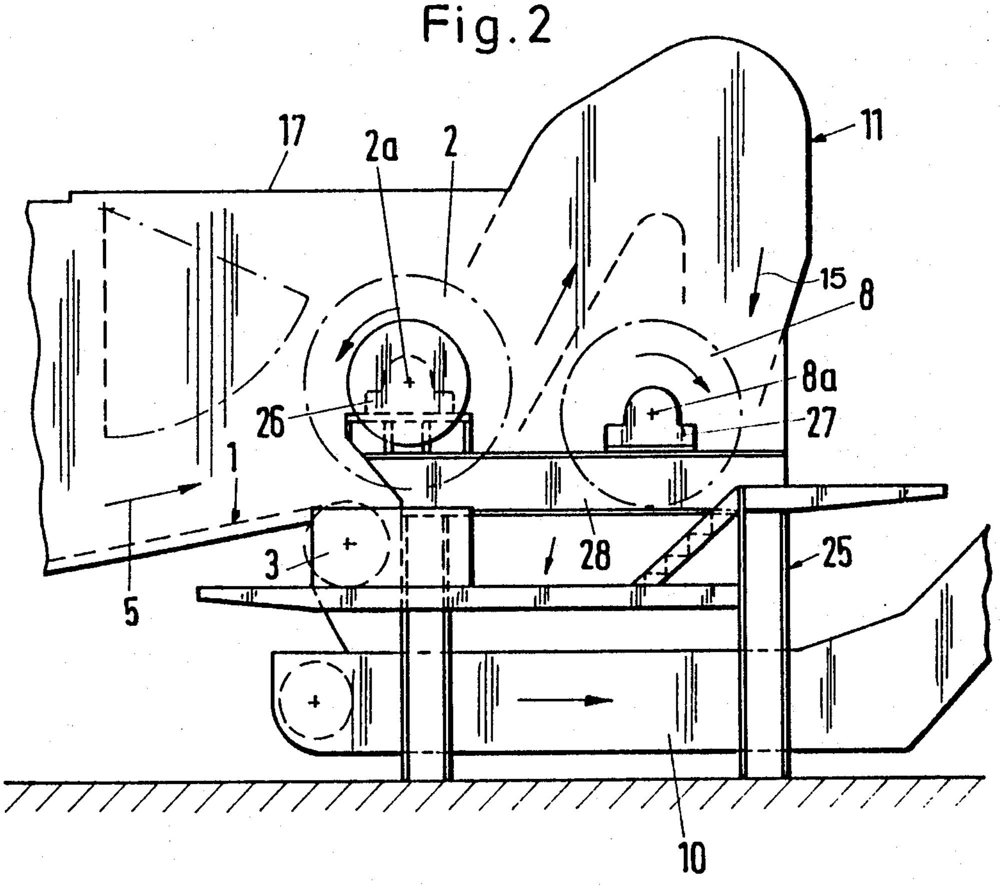
FIG. 2 is a side elevation of the apparatus according to FIG. 1, including the supporting structure.

A roof-like cover 17 extends from the housing section 11*a* as shown in FIGS. 1 and 2 over and beyond the upfront cutter 2, preferably taking the form of a U-shaped tunnel of rectangular cross-section. The free end of the cover 17 has a hinged flap 18 reaching downwardly. The roof-like cover 17 and the hinged flap serve to improve the feed of the material to the upfront cutter and guide any excess material that might pass out of the housing section 11*a*, back onto the conveyor 1.

FIG. 2 shows that the upfront cutter 2 and the shredder 8 are fitted closely one beside the other on a joint supporting structure or machine frame 25. The axes of rotation 2*a* and 8*a* are mounted in bearing brackets 26, 27 on beams 28. The deflecting roller 3 is supported by bearing members on the structure 25. The structure 25 also carries the material guide housing 11 and the cover 17. Side walls of the cover 17 join upright lateral guide walls on both sides of the conveyor 1.

The drive means for the upfront cutter 2 and for the shredder 8 are mounted on the frame 25 on that side which in FIG. 2 faces away from the viewer.

Figure 3:
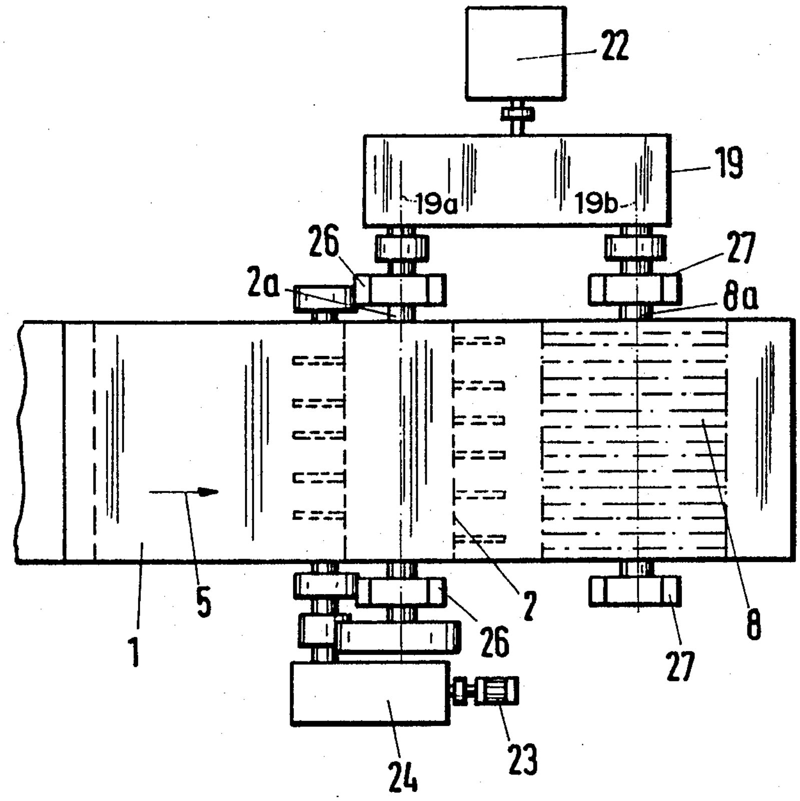
FIG. 3 is a plan view onto the apparatus according to FIG. 1 without the casing.

The plan view of FIG. 3 showing the construction according to FIG. 1 without the casing 11, shows that the shredder 8 and the upfront cutter 2 are connected through separate transmissions 19*a*, 19*b* accommodated in a common gearbox 19, to a drive motor 22 which may, for example, be a turbine. This drive through a common gear box 19 is made possible because the upfront cutter 2 and the shredder 8 are located right next to each other. This compact arrangement also makes it possible that even the drive means for the conveyor 1 for feeding the non-comminuted sugar cane, is integrated and accommodated in the same supporting frame 25. The drive motor 23 with the intermediate transmissions 24 for the conveyor 1 can be seen in FIG. 3. The return roller 3 forms a drive roller and is located in the immediate vicinity of the drive shaft 2*a* of the upfront cutter 2. However, for the sake of clarity the drive means for the conveyor 1 is not illustrated in FIG. 2.

Due to the compact construction and the uniform feed of the present apparatus, in particular to the shredder 8, it is possible for the apparatus to be operated with an energy input which is low compared with known comminuting devices. In addition to the compact structure a uniformly comminuted material is attained for further processing.

Further advantages are seen in that a uniform feed or supply of cut material to the shredder is assured even if an irregular feed of sugar cane onto the conveyor takes place because due to the adjustable drive speed the conveyor can be so adjusted that always a sufficient bed of material is presented to the upfront cutter, specifically to the feed gap of the upfront cutter. Thus, this material bed is virtually milled away by the upfront cutter which ejects the material from its discharge gap in a comminuted state in approximately constant amounts per unit of time. Due to the impact of the material ejected by the upfront cutter onto the impact and deflection wall of the material guide housing, the precomminuted material loses its kinetic energy such that the material falls freely into the shredder feed chute or channel formed by the material guide housing of the invention. Due to the inclined wall portion of the feed chute or channel, the material is fed in the form of a uniformly distributed material bed over the entire length of the feed gap of the shredder. Normally, the material slides along the wall of the casing portion toward the shredder. Alternatively, when loose material is piling up in the feed chute the shredder uniformly draws the material into its shredding zone. In this manner a very uniform comminution of the material is attained by the action of the shredder, whereby the degree of rupturing of the cells of the sugar cane is improved quite considerably. Accordingly, in the subsequent extraction of the prepared sugar cane in cane mills or diffusers, a higher yield is attained.

It is another advantage that the shaft-shaped casing portions are separated on their sides facing each other by two guide housing walls 12, 13 defining between them an acute angle, whereby that housing wall which is directed toward the upfront cutter, extends tangentially to the discharge gaps of the upfront cutter.

Due to the present construction of the material guide housing, the direction of the precomminuted material emerging from the operating gap of the upfront cutter, is determined and the distributive scatter of the material is reduced to ensure that all material particles will in fact be flung against the impact and deflection wall of the guide housing for deflection in the direction of the feed chute of the shredder 8.

It is further advantageous that the cross-sections of the material guide housing extend over only a portion of the circumference of the upfront cutter and of the shredder, respectively, this manner makes it possible to keep the dimensions of the guide housing relatively small while simultaneously improving the guiding of the material emerging from the upfront cutter to the shredder.

The impact and deflection wall portions **11*d*, 11*e*** of the guide housing can take the form of an impact baffle inserted into the casing, whereby the baffle may be ajustable in its position. However, a particularly simple structural embodiment results if the housing wall portion opposite to the upfront cutter and the shredder is itself constructed as an impact and deflection baffle which comprises a rounded section which facilitates the deflection of the material flow emerging from the discharge gap of the upfront cutter into the feed chute of the shredder.

Since the upfront cutter and the shredder are located very close together, it is possible in a preferred embodiment, that the upfront cutter, the shredder, and the material guide housing or casing are mounted in a common mounting structure or machine frame. This feature simplifies the construction and hence reduces the costs considerably. The material fed to the upfront cutter is discharged, after the precomminution, in an upward direction at an incline. Therefore, the conveyor for feeding the non-comminuted cane to the upfront cutter can have a small structural height which in turn advantageously affects the structural height of the entire apparatus.

Due to the mounting of the upfront cutter and of the shredder close to each other it is moreover possible and advantageous to connect the upfront cutter and the shredder through separate power transmissions to a common drive motor. Further, the entire apparatus has a modest height, so that the drive means for the upfront cutter and the shredder can be mounted on a very low foundation whereby again the required structural efforts and the costs are considerably reduced.

During the feeding of the not yet comminuted sugar cane to the upfront cutter, a major accumulation of cut material could occur above the cutter. This material could be pushed over the upfront cutter and possibly even out of the housing. Therefore, it is advantageous to provide a roof-shaped cover extending at a distance above the upfront cutter and beyond the upfront cutter above the supply conveyor. The cover should also be equipped at its free end with a downwardly directed hinged flap for guiding excess already cut material back onto the supply conveyor. The roof-shaped cover could form a tunnel of rectangular cross-section into which the material 1 is moved by the supply conveyor to be peeled off by the upfront cutter. The replenishment of the material is adjusted by an appropriate regulation of the speed of the supply conveyor. The speed adjustment may be performed automatically as a function of the instantaneous position of the hinged flap, especially when precut material is supplied to the upfront cutter.

Although the invention has been described with reference to specific example embodiments, it will be appreciated, that it is intended to cover all modifications and equivalents within the scope of the appended claims.

What I claim is:

1. An apparatus for comminuting plant material for further treatment, comprising upfront cutter means for cutting the plant material into pieces, adjustable speed conveyor means for conveying the plant material to said upfront cutter means, a washboard for cooperation with said upfront cutter means, separate shredder means arranged downstream of said upfront cutter means for shredding said pieces of the plant material, said upfront cutter means and said shredder means being arranged immediately adjoining each other to form a discharge gap between the upfront cutter means and the shredder means and having their respective axes of rotation arranged in a common horizontal or inclined plane, said upfront cutter means discharging said pieces of the plant material in an upward direction approximately prependicularly to said common plane, said shredder means discharging shredded plant material downwardly from said common plane, said apparatus further comprising housing means for guiding said pieces of the plant material from said upfront cutter means to said shredder means, said housing means having an inner wall portion (12, 13) forming a first inverted V-configuration with a first leg (13) reaching into said gap for guiding cut material upwardly and with a second leg (12) leading back down to said shredder, and an outer wall portion (11) also having a second inverted V-configuration spaced from said first inverted V-configuration for enclosing between said inner wall portion and said outer wall portion of said housing means said housing means further comprising a guide channel having a first channel section leading upwardly from said upfront cutter means, a direction changing second channel section, and a third channel section leading downwardly to said shredder means, said second channel section interconnecting said first and third channel sections, whereby said first channel section reaches over and beyond said discharge gap of said upfront cutter means, and wherein said outer wall portion has an approximately downwardly facing wall zone **(11*d*, 11*e*)** remote from said upfront cutter means and remote from said shredder means, said downwardly facing wall zone forming an impact and deflection baffle for uniformly distributing and feeding cut material ejected by said upfront cutter means directly onto said shredder means in a uniformly distributed material bed along an on the entire length of said shredder means, said impact and deflection baffle formed by said wall zone absorbing kinetic energy from said cut material ejected by said upfront cutter means.

2. The apparatus of claim 1, wherein said first leg (13) leads approximately tangentially away from said discharge gap (*6a*), and wherein said washboard is arranged between said conveyor means and said first leg of said inner wall portion of the housing means.

3. The apparatus of claim 1, wherein a portion of said housing means has a cross-section extending over only a portion of a circumference of said upfront cutter means, and wherein a portion of said housing means has a cross-section extending only over a portion of a circumference of said shredder means.

4. The apparatus of claim 1, further comprising machine frame means provided in common for mounting said upfront cutter means, said shredder means and said housing means.

5. The apparatus of claim 1, further comprising common drive motor means for said upfront cutter means and for said shredder means, and separate transmission means for separately connecting said upfront cutter means and said shredder means to said common drive motor means.

6. The apparatus of claim 1, further comprising roof cover means extending a distance above said upfront cutter means and beyond said upfront cutter means in a direction substantially opposite to the plant material feed advance direction, and hinged flap means extending downwardly from said cover means approximately from a free end of said cover means.

* * * * *